Figure 1:
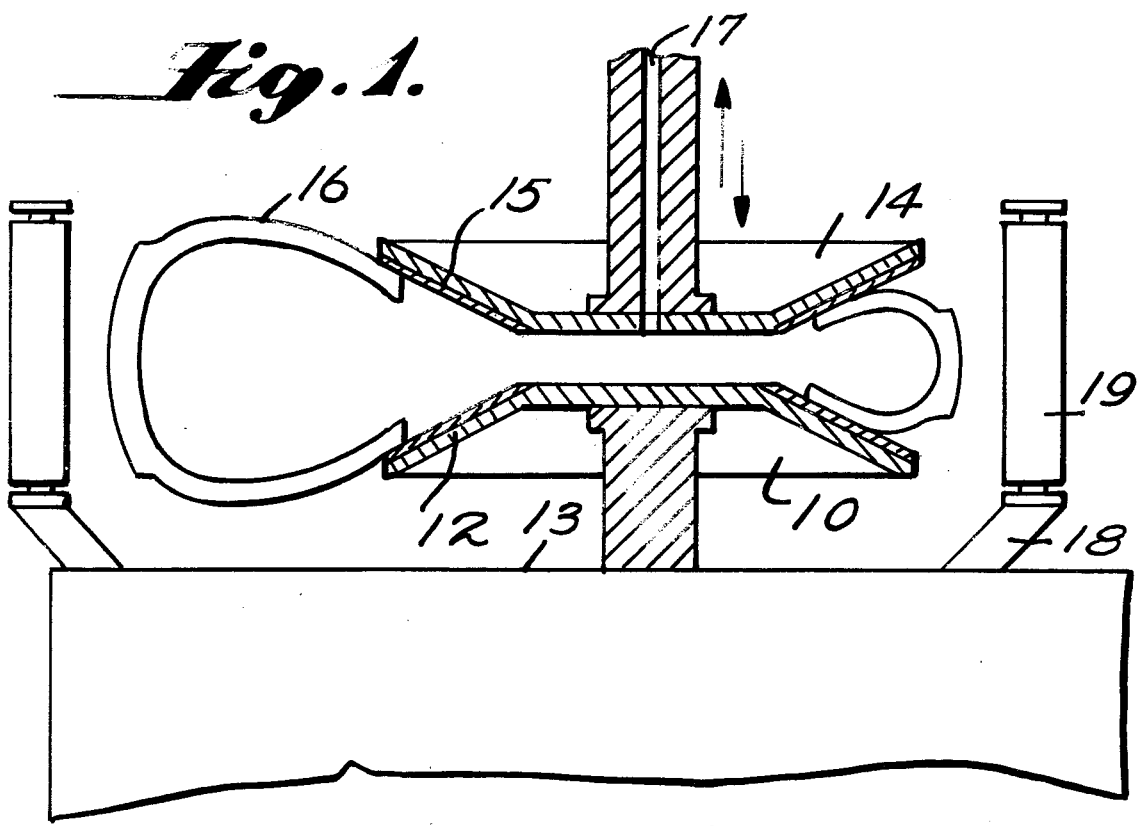

United States Patent [19]
Honlinger

[11] 3,948,094
[45] Apr. 6, 1976

[54] RECEIVING FIXTURE FOR TIRES OF MOTOR VEHICLE WHEELS

[75] Inventor: Herwig Honlinger, Jugenheim, Germany

[73] Assignee: Gebr. Hofmann, Darmstadt, Germany

[22] Filed: Dec. 3, 1974

[21] Appl. No.: 529,068

Related U.S. Application Data

[63] Continuation of Ser. No. 291,164, Sept. 22, 1973.

[30] Foreign Application Priority Data
Oct. 1, 1971    Germany............................ 2149115

[52] U.S. Cl................................. 73/146; 301/63 DS
[51] Int. Cl.².......................................... G01M 17/02
[58] Field of Search ......... 73/146, 49; 301/45.6, 97, 301/63 DS; 152/405

[56]    References Cited
UNITED STATES PATENTS

| | | | |
|---|---|---|---|
| 1,965,058 | 7/1934 | Seabra | 301/63 DS |
| 2,128,322 | 8/1938 | Riehl | 152/405 |
| 2,493,879 | 1/1950 | Koniskey | 152/405 |

Primary Examiner—Donald O. Woodiel
Attorney, Agent, or Firm—Cushman, Darby & Cushman

[57]    ABSTRACT

A tire fixture which can hold tires having a variety of sizes for inflation with minimum air with a pair of opposed plates each having extending, flat tire engaging surfaces, preferably rubber covered, for gripping the tire. The surfaces may be truncated cones or may extend parallel to each other.

2 Claims, 2 Drawing Figures

RECEIVING FIXTURE FOR TIRES OF MOTOR VEHICLE WHEELS

This is a continuation, of application Ser. No. 291,164 filed Sept. 22, 1972.

The invention relates to a receiving fixture for holding tires of motor vehicle wheels for testing.

The fixture of this invention makes it possible for tires to be held on tire testing machines so that they are sealed on the tire casing in order to be inflated from inside.

In known tire testing machines the tire is placed on a plate and sealed from above by means of a bell-shaped top. There is the disadvantage, however, that firstly a large volume of air is required for inflation since the bell must also be filled with air and that secondly the skirt of the bell considerably deforms the tire which is extremely detrimental since it is not designed for withstanding axial load. Furthermore, stepped receiving fixtures are known which are disadvantageous, however, in that because of the steps they allow accommodation only of a limited number of tire sizes in order to ensure perfect sealing. If all tire sizes are to be handled several different plates must be provided which have to be exchanged as required. This type of fixture is expensive and working with it, therefore, very bothersome.

It is the purpose of the invention that all tire sizes of passenger cars and trucks be accommodated without the need for steps and the beads be perfectly sealed and that in addition the air volume required be kept to a minimum.

This object is attained according to the invention in that the receiving fixture for the tire consists either of two cones which are opposite to each other and preferably covered with rubber in order to compensate for an intended or unintended raising on the tire surface (letters on side wall) or of two flat plates which are preferably covered with rubber as well. Any other suitable elastic material may be used for sealing. After loading by hand or another suitable means of transportation the tire is located preferably by three arms positively converging toward the center. The tapered or flat adapter plates accommodate almost any tire size and the quantity of air required for inflating the tire is minimal. Moreover, the flat plates, when moving towards each other, prevent canting and so seal the tire always absolutely towards outside. Another advantage of this device is that any tire size can be accommodated in one and the same position of the plates which is as prerequisite to certain tire testing machines as for instance x-ray equipment for tire inspection. If in this position of the plates the air cannot be retained in the tire, the plates may further be moved towards each other until inflating is possible. The plates may subsequently be spread apart until they are in the required position with the tire beads remaining pressed against the surface of the plates. The tire receiving plates may also be pivotally attached to their axis of symmetry if this is necessary for certain tire testing machines.

Figure 2:
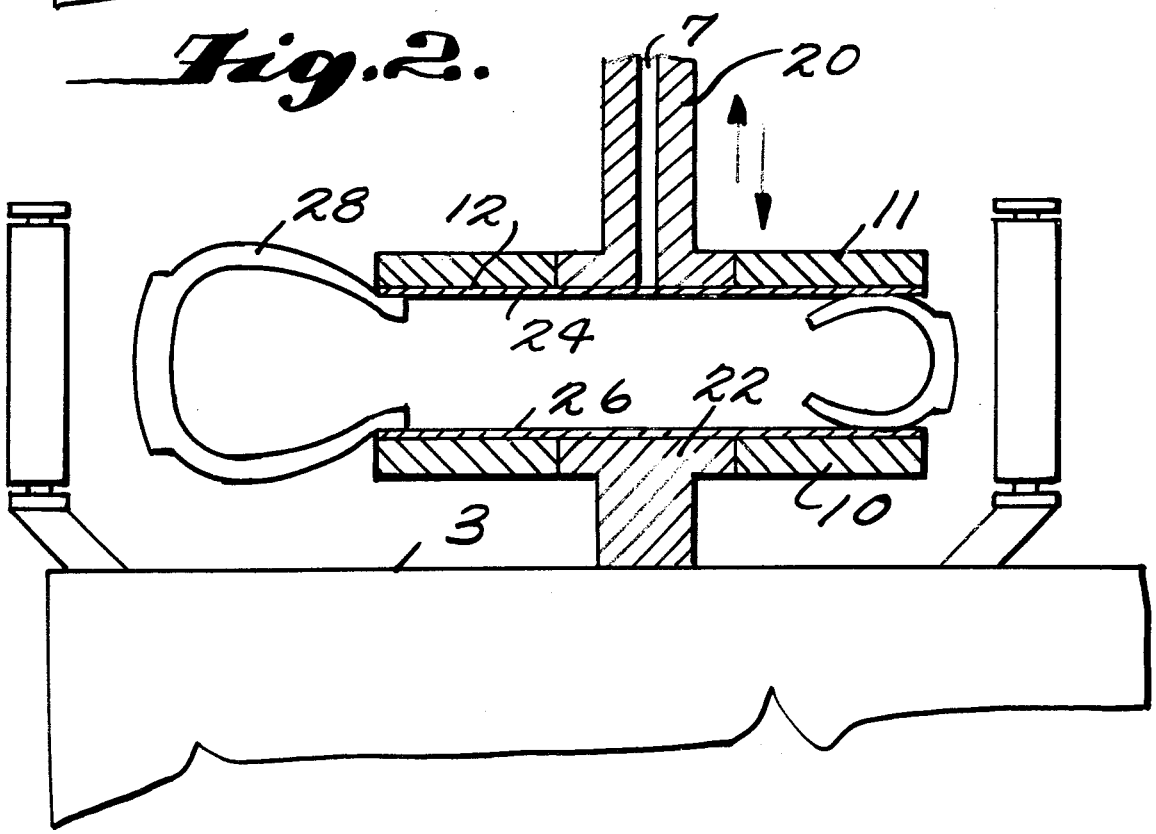

The invention is now described in more detail and with reference to the drawings of which:

FIG. 1 is a sectional view of a receiving fixture for motor vehicle wheels with tapered plates; and FIG. 2 is a sectional view of a receiving fixture for motor vehicle wheels with flat plates.

Referring to FIG. 1, a tapered plate 10, preferably covered on its inclined flat surface with a rubber layer 12 is disposed on a main casing 13. A second similar tapered plate 14 also covered with a rubber layer 15 descends from above by any suitable means onto a mounted tire 16 sealing it in such a way that the tire 16 may be inflated with air through a central feed line 17 from a suitable source (not shown). Levers 18 which carry preferably rolls 19 may be provided for centering. Preferably three concentrically disposed rollers 19 are provided. The necessary inward movement of the levers 18 can be effected by known means. Tire 16 is shown at the right before inflating and at the right after inflating.

FIG. 2 shows a receiving fixture in which the opposed plates 20 and 22 are flat and also covered with elastic material, layers 24 and 26 respectively. Plates 20 and 22 grip tire 28 in the same fashion as plates 10 and 14 in FIG. 1.

Many changes and modifications in the abovedescribed embodiments can of course be made without departing from the scope of the invention. Accordingly, that scope is intended to be limited only by the scope of the appended claims.

What is claimed is:

1. A tire receiving and holding fixture having a pair of opposed mounting plates each having an extending flat tire engaging surface covered with an elastic material and formed as a truncated cone, said surfaces sloping toward each other for engaging opposing tire surfaces so as to accommodate a tire having a diameter within given limits and a plurality of rollers disposed about said plates for centering a tire held between said plates.

2. A fixture as in claim 1 wherein said material is rubber.

* * * * *